United States Patent
Xie et al.

(10) Patent No.: US 9,764,535 B2
(45) Date of Patent: Sep. 19, 2017

(54) METHOD FOR MAKING CERAMIC THIN EXTERIOR PART

(71) Applicants: Tsinghua University, Beijing (CN); HON HAI PRECISION INDUSTRY CO., LTD., New Taipei (TW)

(72) Inventors: Zhi-Peng Xie, Beijing (CN); Hong-Yan Yan, Beijing (CN); Yu-Xi Liao, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 335 days.

(21) Appl. No.: 14/621,387

(22) Filed: Feb. 13, 2015

(65) Prior Publication Data
US 2015/0232390 A1    Aug. 20, 2015

(30) Foreign Application Priority Data
Feb. 18, 2014    (CN) .......................... 2014 1 0054368

(51) Int. Cl.
*C03B 29/00*    (2006.01)
*B29C 53/00*    (2006.01)
(Continued)

(52) U.S. Cl.
CPC ............ *B32B 18/00* (2013.01); *C04B 35/486* (2013.01); *C04B 35/4885* (2013.01);
(Continued)

(58) Field of Classification Search
CPC ..... C04B 37/005; C04B 35/48; C04B 35/486; C04B 35/01; C04B 35/10; C04B 35/111;
(Continued)

(56) References Cited

U.S. PATENT DOCUMENTS

| 4,867,935 A | * | 9/1989 | Morrison, Jr. .......... B32B 18/00 |
| | | | 156/89.12 |
| 4,929,295 A | * | 5/1990 | Kohno ................ C04B 41/5194 |
| | | | 156/230 |

(Continued)

FOREIGN PATENT DOCUMENTS

| CN | 1203206 | 12/1998 |
| CN | 102718497 | 1/2014 |

(Continued)

OTHER PUBLICATIONS

Fuchi, "JP 2007-184333 A, machine translation", PUblished Jul. 19, 2007.*

(Continued)

*Primary Examiner* — Alex Efta
(74) *Attorney, Agent, or Firm* — Steven Reiss

(57) ABSTRACT

A method for making a thin ceramic part involves making a casting slurry including a ceramic powder, a solvent, a binder, a plasticizer, and a dispersant. The casting slurry is tape casted to achieve a single layer green tape. At least two single layer green tapes are laminated to form a green tape lamination. The green tape lamination is dry pressed, dried, shaped, degreased, and fired to achieve the exterior component required.

18 Claims, 2 Drawing Sheets

(51) Int. Cl.

| | |
|---|---|
| *C04B 33/32* | (2006.01) |
| *B29C 47/76* | (2006.01) |
| *B01D 53/24* | (2006.01) |
| *B01D 53/06* | (2006.01) |
| *B01D 53/14* | (2006.01) |
| *B32B 18/00* | (2006.01) |
| *C04B 35/64* | (2006.01) |
| *C04B 35/622* | (2006.01) |
| *C04B 37/00* | (2006.01) |
| *C04B 35/486* | (2006.01) |
| *C04B 35/488* | (2006.01) |
| *C04B 35/632* | (2006.01) |
| *C04B 35/634* | (2006.01) |
| *C04B 35/638* | (2006.01) |
| *C04B 35/626* | (2006.01) |
| *C04B 35/109* | (2006.01) |
| *C04B 35/10* | (2006.01) |
| *C04B 35/48* | (2006.01) |

(52) U.S. Cl.
CPC ........ *C04B 35/622* (2013.01); *C04B 35/6261* (2013.01); *C04B 35/62625* (2013.01); *C04B 35/632* (2013.01); *C04B 35/634* (2013.01); *C04B 35/638* (2013.01); *C04B 35/64* (2013.01); *C04B 37/005* (2013.01); *C04B 35/10* (2013.01); *C04B 35/109* (2013.01); *C04B 35/48* (2013.01); *C04B 35/6263* (2013.01); *C04B 35/62218* (2013.01); *C04B 35/62615* (2013.01); *C04B 2235/5409* (2013.01); *C04B 2235/5445* (2013.01); *C04B 2235/606* (2013.01); *C04B 2235/6025* (2013.01); *C04B 2235/6562* (2013.01); *C04B 2235/6567* (2013.01); *C04B 2237/064* (2013.01); *C04B 2237/343* (2013.01); *C04B 2237/348* (2013.01)

(58) Field of Classification Search
CPC .......... C04B 2237/04; C04B 2237/068; C04B 2237/32; C04B 2237/343; C04B 2237/348; C04B 2237/064; C04B 35/109; C04B 35/622; C04B 35/62218; C04B 35/62615; C04B 35/62625; C04B 35/6263; C04B 35/638; C04B 35/64; C04B 2235/6025
USPC ...... 264/638, 650, 656, 102; 95/35, 36, 113, 95/219, 270
See application file for complete search history.

(56) References Cited

U.S. PATENT DOCUMENTS

| | | | | |
|---|---|---|---|---|
| 5,473,008 | A * | 12/1995 | Hessel | C04B 35/63404 428/325 |
| 8,277,540 | B2 * | 10/2012 | Hassan | B01D 53/22 55/400 |
| 9,570,218 | B2 * | 2/2017 | Li | H01F 1/0027 |
| 2003/0016484 | A1 * | 1/2003 | Iwaida | B32B 18/00 361/306.3 |
| 2011/0198785 | A1 * | 8/2011 | Kester | B28B 5/027 264/642 |

FOREIGN PATENT DOCUMENTS

| | | | |
|---|---|---|---|
| CN | 102718497 B | * | 1/2014 |
| JP | 2007184333 A | * | 7/2007 |

OTHER PUBLICATIONS

Liu, "CN 102718497 B, machine translation", published Jan. 15, 2014.*

* cited by examiner

METHOD FOR MAKING CERAMIC THIN EXTERIOR PART

CROSS-REFERENCE TO RELATED APPLICATIONS

This application claims all benefits accruing under 35 U.S.C. §119 from China Patent Application No. 201410054368.6, filed on Feb. 18, 2014 in the China Intellectual Property Office, the contents of which are hereby incorporated by reference.

FIELD

The subject matter herein generally relates to ceramics manufacture.

BACKGROUND

Handheld portable devices, such as smart phones, lap tops, and tablets, have an exterior part such as an enclosure that is commonly made of plastic or metal. Ceramic materials with high strength, chemical stability, and wear resistance are also used as the materials for forming the exterior parts. The ceramic exterior parts are conventionally formed by methods such as dry pressing, slip casting, and hot injection molding.

Tape casting, which is a technique used to prepare thin films, is adopted for casting ceramic materials to make micron sized electronic parts such as ceramic sensors, piezoelectric members, capacitors, and microwave dielectric components. However, the tape casting has not been used in the forming of the exterior part of the portable device.

BRIEF DESCRIPTION OF THE DRAWING

Implementations of the present technology will now be described, by way of example only, with reference to the attached figures.

DETAILED DESCRIPTION

Figure 1:
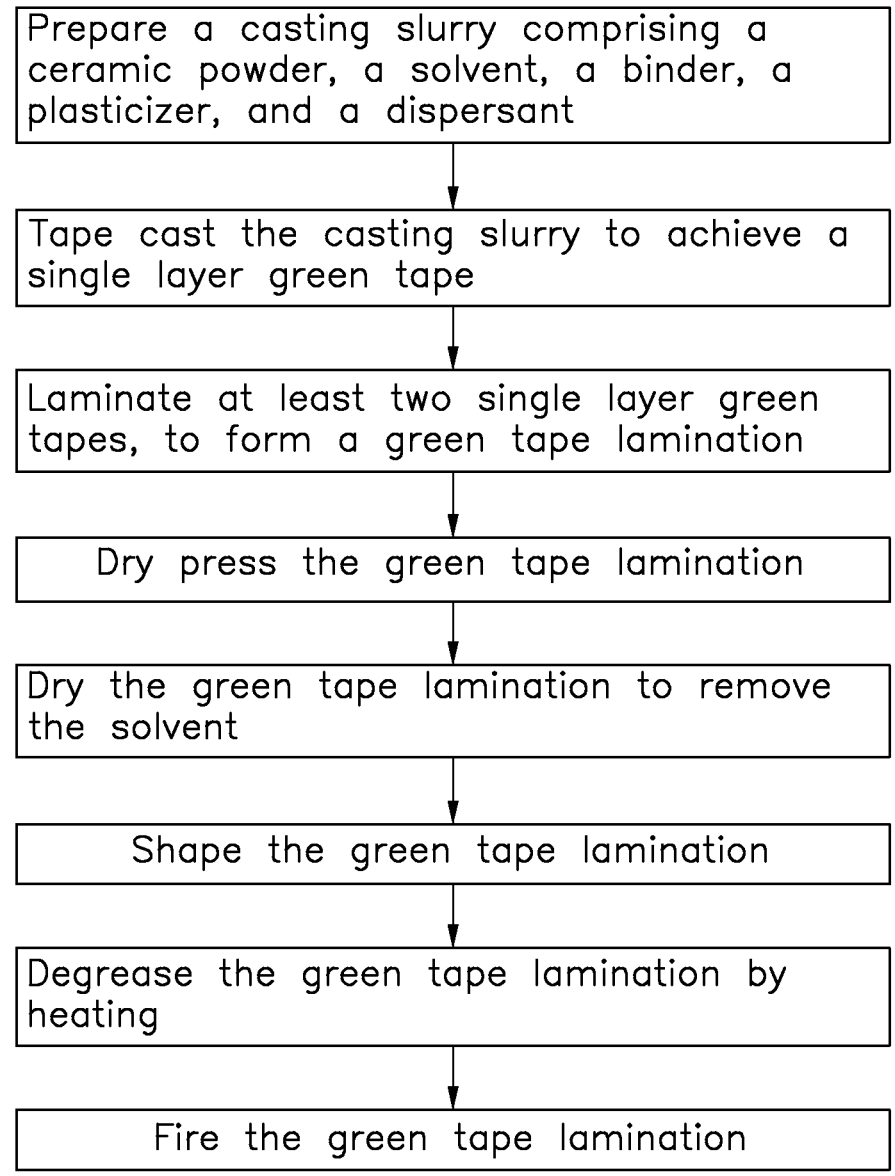
FIG. 1 is a flow chart of an embodiment of a method for making thin exterior part of portable device in ceramic.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other feature that is described, such that exact conformance with the description is not required. The term "comprising," when utilized, means "including, but not necessarily limited to"; it specifically indicates open-ended inclusion or membership in the so-described combination, group, series, and the like. The term "green" refers to unfired objects in the art of ceramics.

Referring to FIG. 1, the present disclosure is described in relation to a method for making a thin ceramic part for the exterior of a portable device.

In block S1, a casting slurry is prepared. The casting slurry comprises a ceramic powder, a solvent, a binder, a plasticizer, and a dispersant. Based on the total weight of the casting slurry, the ceramic powder can be in an amount of about 50% to about 60%, the solvent can be in an amount of about 30% to about 60%, the binder can be in an amount of about 3% to about 7%, the plasticizer can be in an amount of about 3% to about 9%, and the dispersant can be in an amount of about 0.5% to about 1.5%, all by weight. In one embodiment, the casting slurry also comprises a defoamer that can be in an amount of about 0.5% to about 1.5% by weight, based on the total weight of the casting slurry.

In one embodiment, the casting slurry can be prepared by steps of:

S11, weighting the ceramic powder, solvent, binder, plasticizer, and dispersant in the above described amounts;

S12, mixing the ceramic powder, the dispersant and a part of the solvent in a ball-milling device to have a first ball-milling for about 12 hours to about 20 hours to achieve a first slurry; and S13, adding the binder, the plasticizer, and the remaining part of the solvent in the ball-milling device to mix with the first slurry and have a second ball-milling for about 10 hours to about 20 hours to achieve the final casting slurry.

The casting slurry has a viscosity that is suitable for casting a green body with a thin uniform thickness. In one embodiment, the viscosity of the casting slurry can be in a range from about 5 Pa·s to about 30 Pa·s.

The ceramic powder can be at least one of zirconium oxide, aluminum oxide, and combinations of zirconium oxide and aluminum oxide. An average size of the ceramic powder particles can be in a range from about 0.1 microns to about 1 micron. The dispersant can be a non-ionic surfactant such as glyceryl trioleate, oleic acid, castor oil, and fish oil. The solvent can be a mixture of two kinds of solvents, wherein a main solvent is ethanol or n-butanol, and the other minor solvent is acetone or ethylene glycol. The binder can be polyvinyl butyral or poly methyl methacrylate. The plasticizer can be poly(oxyethylene) or dibutyl phthalate. The defoamer can be at least one of N-butanol and ethylene glycol.

In one embodiment, in the first slurry of the first ball-milling, the ceramic powder is in the amount of about 60% to about 80%, the solvent is in the amount of about 20% to about 30%, and the dispersant is in the amount of about 0.1% to about 0.3%, all by weight, based on the total weight of the first slurry. Based on the total weight of the added binder, plasticizer, and remaining part of the solvent in the second ball-milling, the plasticizer is in the amount of about 35% to about 45%, the binder is in the amount of about 25% to about 35%, and the remaining part of the solvent is in the amount of about 25% to about 35%, all by weight.

After block S1, the casting slurry can be further defoamed. In one embodiment, the air in the container filled by the casting slurry can be vacuumed. However, the vacuuming also removes the solvent in the casting slurry and increases the viscosity of the casting slurry, which is disadvantageous for the tape casting. In another embodiment, the casting slurry can be put into a closed container and rotated at high speed (e.g. a centrifuge) to defoam the casting slurry. The rotating speed can be in a range from about 1500 r/min to about 2500 r/min. The rotating time period can be in a range from about 5 minutes to about 30 minutes. During the rotating, the foam or bubbles in the casting slurry rise to the top of the casting slurry and there break due to the centrifugal force of the rotating. The high-speed rotating to defoam the casting slurry in the closed container avoids the loss of the solvent and thus avoids the viscosity increase of the casting slurry.

In yet another embodiment, the ball-milling device can be a high energy ball-milling machine, and the defoaming steps can be included in the high energy ball-milling machine. The high energy ball-milling machine can achieve (including the above described steps S12 and S13) the required defoaming of the casting slurry at the rotating speed from about 800 r/min to about 2200 r/min for about 20 minutes to about 30 minutes. The steps S12 and S13 and the defoaming steps carried out by the high energy ball-milling machine can be in three stages, which are low speed stage, high speed stage, and low speed stage. For example, in one embodiment, the casting slurry can be ball-milled at a speed of about 800 r/min for about 1 minute following by defoaming at a speed of 1000 r/min for about 1 minute in the first stage, and then ball-milled at a speed of about 2000 r/min for about 15 minutes following by defoaming at a speed of 2200 r/min for about 2 minutes in the second stage, and finally ball-milled at a speed of about 1000 r/min for about 2 minutes.

The processes of forming and defoaming the casting slurry in the same ball-milling device can keep the solvent at a stable amount in the casting slurry and avoid the loss of the solvent thus avoiding any viscosity increase of the casting slurry.

Figure 2:
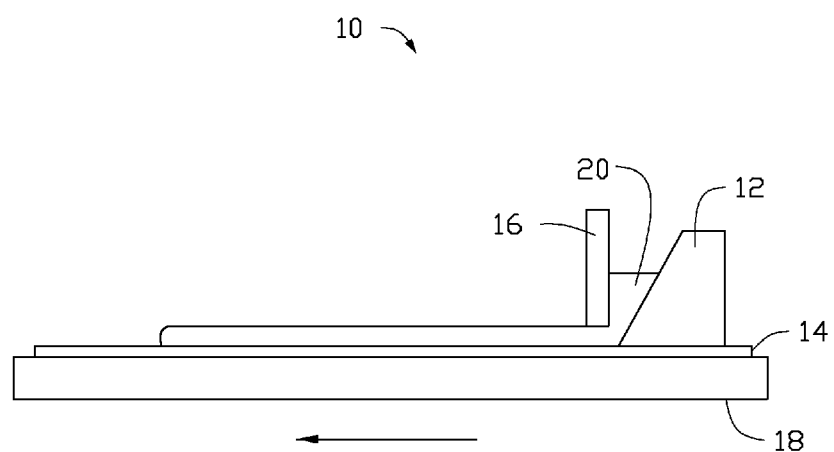
FIG. 2 is a schematic view of one embodiment of a tape casting apparatus.

In block S2, the casting slurry is tape casted to achieve a single layer green tape. Referring to FIG. 2, the tape casting apparatus 10 is conventional and can comprise a casting head 12 for applying casting slurry 20 to a support strip 14, a doctor blade 16 spaced above the support strip 14, and a support strip movement system 18 for moving the support strip 14 relative to the casting head 12 and the doctor blade 16. The moving of the support strip 14 is synchronized with the applying of the casting slurry 20 on the support strip 14. The casting slurry 20 moves with the support strip 14 and passes through the opening between the doctor blade 16 and the support strip 14 to form a wet coating on the support strip 14. The thickness of the wet coating depends on the viscosity of the casting slurry 20, the height of doctor blade 16 above the support strip 14, and the movement speed of the support strip 14. In one embodiment, the moving speed of the support strip 14 (i.e., the tape casting speed) can be in a range from about 0.08 m/s to about 0.12 m/s, the height of the doctor blade 16 above the support strip 14 can be in a range from about 1000 microns to about 3000 microns. The support strip 14 has chemical stability, corrosion and heat resistances, and is not deformable. After the majority of the solvent in the wet coating is dried, the single layer green tape is formed and has a thickness (t) of 0.2 mm≤t<0.8 mm and a width of more than 5 cm (e.g., 5 cm~15 cm).

In block S3, a plurality of single layer green tapes are laminated to form a green tape lamination. In one embodiment, the laminating of the plurality of single layer green tapes comprises steps of: coating a layer of casting slurry on the surface of the single layer green tape; and sandwiching the layer of casting slurry between two adjacent single layer green tapes to form a green tape lamination.

A layer of casting slurry can have a thickness of about 0.1 mm to about 0.2 mm. The green tape lamination can comprise a plurality of single layer green tapes laminated together, and each two adjacent single layer green tapes have a layer of casting slurry sandwiched therebetween. The green tape lamination is flexible and can be punched or cut into different shapes.

In block S4, the green tape lamination is dry pressed. The dry pressing can apply a pressing force of about 6 MPa to about 10 MPa for about 3 minutes to 10 minutes. In one embodiment, the dry pressing applies a pressing force of about 8 MPa for about 4 minutes to the green tape lamination.

In block S5, the dry pressed green tape lamination is dried to remove the solvent. The green tape lamination can be dried at about 20° C. to about 60° C. for about 1 hour to about 2 hours. In one embodiment, the green tape lamination is dried in a solvent-rich atmosphere to prevent high speed evaporation of the solvent in the green tape lamination which might induce cracks or holes in the green tape lamination. The solvent-rich atmosphere comprises the solvent used in the slurry in gaseous form. For example, the solvent in the casting slurry is a combination of ethanol and butanone in a volume ratio of about 3:2, and the green tape lamination is dried in an atmosphere of ethanol and butanone in gaseous form in the volume ratio of about 3:2. In one embodiment, the steps in blocks S2 to S5 are all carried out in the solvent-rich atmosphere. After block S5, the dried green tape lamination has a thickness of about 0.8 mm to about 1.6 mm, wherein a dried single layer green tape has a thickness of less than 0.8 mm.

In block S6, the dried green tape lamination is shaped to form desired shape and size. The dried green tape lamination can be punched or cut into desired shape and size.

In step S7, the shaped green tape lamination is degreased by heating in an oven at a temperature of about 250° C. to about 600° C. to achieve a degreased shaped green tape lamination. The organic agents such as the binder, the plasticizer, the dispersant, and the defoamer are removed from the green tape lamination at this temperature. In one embodiment, the heating temperature for the shaped green tape lamination is increased at a rate of about 0.5° C./min to about 1.0° C./min to about 600° C., and kept at about 600° C. for about 0.5 hours to about 2 hours.

In step S8, the degreased green tape lamination is fired in a furnace at a temperature of about 1400° C. to about 1600° C. for about 1 hour to about 3 hours, and naturally cooled to achieve the thin ceramic exterior part. The thin ceramic exterior part can have a thickness of about 0.6 mm to about 1.5 mm.

The conventional tape casting method has its own limitation in relation to the viscosity of the slurry. The thickness of the wet coating does not only depend on the height of doctor blade above the support strip, but also relates to the viscosity of the casting slurry and the movement speed of the support strip. Thus, even if the doctor blade was lifted higher above the support strip for a larger opening, the slurry would automatically spread on the support strip up to a maximum thickness (conventionally less than 0.8 mm). During the firing, the thickness of the ceramic tape further decreases.

Therefore, the conventional tape casting method is commonly used to form electronic elements with micron sized thickness. In the present method embodiment, the formed green tape lamination can have a thickness larger than 0.8 mm without deformations or cracks, and can be used in forming a thin but strong exterior part of portable device.

Example 1

96.8 g of zirconium oxide ceramic powder with an average particle size of about 0.2 microns to about 0.3 microns and a specific surface area of about 11 $m^2$/g, 60 ml of a combination of ethanol and acetone, 1.6 ml of glyceryl trioleate, and 2 ml of a combination of N-butanol and ethylene glycol with a volume ratio of about 1:1 are mixed together in a ball-milling device and have a first ball-milling process for about 16 hours. 8.3 g of polyvinyl butyral, 9.4 ml of a mixture of poly(oxyethylene) and dibutyl phthalate, and 10 ml of a combination of ethanol and butanone are added to the ball-milling device to undergo a second ball-milling process for about 13 hours to achieve the casting slurry.

The casting slurry is put into a sealed container and rotated at high speed at a rotating speed of about 2200 r/min for about 10 minutes to remove foam and bubbles from the casting slurry.

Then the casting slurry is tape casted by using a tape casting apparatus at a tape casting speed of about 0.12 m/s in a solvent-rich atmosphere to form a single layer green tape with a thickness of about 0.5 mm and a width of about 10 cm.

The casting slurry is then coated on the single layer green tape with a thickness of about 0.1 mm to about 0.2 mm. Another single layer green tape is laminated on the layer of the casting slurry. The lamination of the two single layer green tapes are pressed in a dry pressing device with a pressing force of about 8 MPa for about 4 minutes.

The lamination is rested in the solvent-rich atmosphere at about 50° C. for about 1 hour to evaporate the solvent. The dried lamination has a thickness of about 1 millimeter. The dried lamination is punched into a desired shape according to the required shape of the exterior part of portable device. The shaped lamination is heated, the temperature increasing at a rate of about 0.5° C./min to about 600° C., and the shaped lamination is kept at 600° C. for about 1 hour to remove by degreasing the organic agents therein.

The degreased lamination is fired at about 1480° C. for about 1 hour and cooled naturally to achieve the exterior part of portable device having a thickness of about 0.8 mm and a density of about 6.05 $g/cm^3$.

Example 2

87.8 g of a combination of zirconium oxide ceramic powder and aluminum oxide ceramic powder (aluminum oxide ceramic powder taking 10% of the total weight of the combination) with an average particle size of about 0.3 microns to about 0.5 microns and a specific surface area of about 8 $m^2$/g, 55 ml of a combination of ethanol and acetone, 1.4 ml of glyceryl trioleate, and 1.5 ml of a combination of N-butanol and ethylene glycol with a volume ratio of about 1:1 are mixed together in a ball-milling device and undergo a first ball-milling process for about 13 hours. 7.5 g of polyvinyl butyral, 8.7 ml of dibutyl phthalate, and 9.5 ml of a combination of ethanol and acetone are added to the ball-milling device to apply a second ball-milling process for about 11 hours to achieve the casting slurry.

The casting slurry is put into a sealed container and rotated at high speed at a rotating speed of about 2500 r/min for about 5 minutes to remove any foam and bubbles.

Then the casting slurry is tape casted by using a tape casting apparatus at a tape casting speed of about 0.11 m/s in a solvent-rich atmosphere to form a single layer green tape with a thickness of about 0.7 mm and a width of about 10 cm.

The casting slurry is then coated on the single layer green tape with a thickness of about 0.1 mm to about 0.2 mm. Another single layer green tape is laminated on the layer of the casting slurry. The lamination of the two single layer green tapes are pressed in a dry pressing device with a pressing force of about 8 MPa for about 4 minutes.

The lamination is rested in the solvent-rich atmosphere at about 40° C. for about 2 hours to evaporate the solvent. The dried lamination has a thickness of about 1.4 mm. The dried lamination is punched into a desired shape according to the required shape. The shaped lamination is heated, the temperature increasing at a rate of about 1° C./min to about 600° C., and the shaped lamination is kept at 600° C. for about 0.5 hour to remove by degreasing the organic agents therein.

The degreased lamination is fired at about 1530° C. for about 1.5 hours and cooled naturally to achieve the required component having a thickness of about 1.2 mm and a density of about 5.60 $g/cm^3$.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for making a ceramic exterior part, the method comprising:
    preparing a casting slurry comprising a ceramic powder, a solvent, a binder, a plasticizer, and a dispersant;
    defoaming the casting slurry in a closed container with a rotating speed in a range from about 1500 r/min to about 2500 r/min;
    tape casting the casting slurry to achieve a single layer green tape;
    laminating at least two single layer green tapes, to form a green tape lamination, comprising;
    coating a layer of casting slurry on a surface of one single layer green tape; and
    sandwiching the layer of casting slurry between two single layer green tapes to form the green tape lamination;
    dry pressing the green tape lamination to form a dry pressed green tape lamination;

drying the dry pressed green tape lamination to remove the solvent in the green tape lamination and form a dried green tape lamination;

shaping the dried green tape lamination into a shaped green tape lamination;

degreasing the shaped green tape lamination by heating to achieve a degreased green tape lamination; and firing the degreased green tape lamination.

2. The method of claim 1, wherein based on a total weight of the casting slurry, the ceramic powder is in an amount of about 50% to about 60%, the solvent is in an amount of about 30% to about 60%, the binder is in an amount of about 3% to about 7%, the plasticizer is in an amount of about 3% to about 9%, and the dispersant is in an amount of about 0.5% to about 1.5%, all by weight.

3. The method of claim 1, wherein the casting slurry is prepared by having steps of:

weighting the ceramic powder, the solvent, the binder, the plasticizer, and the dispersant;

mixing the ceramic powder, the dispersant and a portion of the solvent in a ball-milling device to have a first ball-milling to achieve a first slurry; and adding the binder, the plasticizer, and remaining part of the solvent in the ball-milling device to mix with the first slurry and have a second ball-milling to achieve the casting slurry.

4. The method of claim 3, wherein in the first slurry of the first ball-milling, the ceramic powder is in the amount of about 60% to about 80%, the solvent is in the amount of about 20% to about 30%, and the dispersant is in the amount of about 0.1% to about 0.3%, all by weights based on a total weight of the first slurry.

5. The method of claim 3, wherein based on a total weight of the binder, the plasticizer, and the remaining part of the solvent in the second ball-milling, the plasticizer is in the amount of about 35% to about 45%, the binder is in the amount of about 25% to about 35%, and the rest part of the solvent is in the amount of about 25% to about 35%, all by weight.

6. The method of claim 3, wherein the first ball-milling is carried out for about 12 hours to about 20 hours; and the second ball-milling is carried out for about 10 hours to about 20 hours.

7. The method of claim 1, wherein the ceramic powder is selected from the group consisting of zirconium oxide, aluminum oxide, and combinations of zirconium oxide and aluminum oxide.

8. The method of claim 1, wherein an average particle size of the ceramic powder is in a range from about 0.1 microns to about 1 micron.

9. The method of claim 1, wherein the dispersant is selected from the group consisting of glyceryl trioleate, oleic acid, castor oil, fish oil, and combinations thereof.

10. The method of claim 1, wherein the solvent is a mixture of a main solvent and an additional solvent, the main solvent is selected from the group consisting of ethanol, n-butanol, and a combination thereof; and the additional solvent is selected from the group consisting of acetone, ethylene glycol, and a combination thereof.

11. The method of claim 1, wherein the binder is selected from the group consisting of polyvinyl butyral, poly methyl methacrylate, and a combination thereof.

12. The method of claim 1, wherein the plasticizer is selected from the group consisting of poly(oxyethylene), dibutyl phthalate, and a combination thereof.

13. The method of claim 1, wherein the casting slurry is prepared by using an energy ball-milling machine at a rotating speed from about 800 r/min to about 2200 r/min.

14. The method of claim 1, wherein a viscosity of the casting slurry is in a range from about 5 Pa·s to about 30 Pa·s.

15. The method of claim 1, wherein the drying the dry pressed green tape lamination is in a solvent-rich atmosphere formed by gasifying the solvent in the casting slurry.

16. The method of claim 1, wherein the dry pressing applies a pressing force of about 6 MPa to about 10 MPa to the green tape lamination.

17. The method of claim 1, wherein the degreasing the shaped green tape lamination is heating the shaped green tape lamination at a heating temperature increased at a rate of about 0.5° C./min to about 1.0° C./min to about 600° C., and kept at about 600° C. for about 0.5 hours to about 2 hours.

18. The method of claim 1, wherein the firing the degreased green tape lamination is at a temperature of about 1400° C. to about 1600° C. for about 1 hour to about 3 hours.

* * * * *